United States Patent
Hardin et al.

(10) Patent No.: US 7,515,646 B2
(45) Date of Patent: Apr. 7, 2009

(54) METHOD AND APPARATUS FOR REDUCING EMI EMISSIONS FOR DATA SIGNALS TRAVELING OVER A DATA PATHWAY

(75) Inventors: Keith B. Hardin, Lexington, KY (US); Robert A. Oglesbee, Lexington, KY (US); John P. Richey, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 716 days.

(21) Appl. No.: 10/772,838

(22) Filed: Feb. 5, 2004

(65) Prior Publication Data

US 2005/0185731 A1    Aug. 25, 2005

(51) Int. Cl.
*H04B 15/00* (2006.01)
(52) U.S. Cl. ............ 375/285; 375/462; 375/297; 375/376; 375/347; 375/257; 375/219; 330/251; 330/10; 330/78
(58) Field of Classification Search .......... 375/285, 375/219, 297, 462, 376, 257; 330/251, 10, 330/78
See application file for complete search history.

(56) References Cited

U.S. PATENT DOCUMENTS

| | | | |
|---|---|---|---|
| 3,023,322 A | 2/1962 | Keeler | |
| 3,047,853 A | 7/1962 | Machol | |
| 3,202,975 A | 8/1965 | Magotteaux | |
| 3,328,702 A | 6/1967 | Brown | |
| 3,635,534 A * | 1/1972 | Barnett | 384/106 |
| 3,721,904 A | 3/1973 | Verhoeven | |
| 4,071,692 A | 1/1978 | Weir et al. | |
| 4,100,541 A | 7/1978 | Quesnell, Jr. | |
| 4,475,085 A | 10/1984 | Yahata et al. | |
| 4,507,796 A | 3/1985 | Stumfall | |

(Continued)

FOREIGN PATENT DOCUMENTS

JP    62-63327    3/1987

(Continued)

OTHER PUBLICATIONS

Hamel, H.; Holzman, G.R.; Kleinfelder, W.J.; Kostenko, W.P.; and, Smith, Jr., A.A., "Frequency Modulated Clock For Data Processor For Test For Electromagnetic Radiation And Electromagnetic Compatability," IBM Technical Disclosure Bulletin, vol. 26, No. 1 (Jun. 1983) 1 page.

(Continued)

*Primary Examiner*—Chieh M. Fan
*Assistant Examiner*—Eva Puente
(74) *Attorney, Agent, or Firm*—Frederick H. Gribbell

(57) ABSTRACT

An improved data signal electromagnetic emissions system is provided for sending data signals over one or more data pathways. An original data signal is encoded into a set of sideband frequencies that exhibit a lower amplitude than the original data signal; then transmitted over the data pathway and later decoded back into a signal having the original data content. The encoding scheme uses a number of modulation pattern sets that each produce a set of sidebands about the data signal's fundamental and certain harmonic frequencies, in a manner that attempts to make the maximum amplitudes for each set of sidebands substantially equal to one another, although this is also dependent upon the data signal's frequency content.

30 Claims, 8 Drawing Sheets

U.S. PATENT DOCUMENTS

| | | | |
|---|---|---|---|
| 4,511,924 A | | 4/1985 | Griffis et al. |
| 4,540,945 A | | 9/1985 | Kuroki |
| 4,723,164 A | | 2/1988 | Nienaber |
| 4,828,389 A | * | 5/1989 | Gubbins et al. ............. 356/462 |
| 4,862,478 A | | 8/1989 | McIntosh |
| 4,965,533 A | | 10/1990 | Gilmore |
| 5,012,340 A | | 4/1991 | Kirschenstein |
| 5,079,519 A | | 1/1992 | Ashby et al. |
| 5,105,444 A | | 4/1992 | Gard |
| 5,107,188 A | | 4/1992 | Rindal |
| 5,157,308 A | | 10/1992 | Rindal |
| 5,200,981 A | | 4/1993 | Carmon |
| 5,387,944 A | | 2/1995 | Furumiya |
| 5,399,996 A | | 3/1995 | Yates et al. |
| 5,422,919 A | | 6/1995 | Graham |
| 5,430,392 A | | 7/1995 | Matejic |
| 5,479,445 A | | 12/1995 | Kloker et al. |
| 5,488,627 A | | 1/1996 | Hardin et al. |
| 5,537,068 A | | 7/1996 | Konno |
| 5,631,920 A | | 5/1997 | Hardin |
| 5,659,339 A | | 8/1997 | Rindal et al. |
| 5,731,728 A | | 3/1998 | Greiss |
| 5,736,893 A | | 4/1998 | Puckette et al. |
| 5,771,264 A | | 6/1998 | Lane |
| 5,781,742 A | | 7/1998 | Asano et al. |
| 5,793,988 A | * | 8/1998 | Asano et al. ................ 710/100 |
| 5,867,524 A | | 2/1999 | Booth et al. |
| 5,872,807 A | | 2/1999 | Booth et al. |
| 5,889,819 A | | 3/1999 | Arnett |
| 5,909,144 A | | 6/1999 | Puckette et al. |
| 5,909,472 A | | 6/1999 | Arnett |
| 5,977,898 A | * | 11/1999 | Ling et al. .................. 341/144 |
| 6,014,063 A | | 1/2000 | Liu et al. |
| 6,020,939 A | | 2/2000 | Rindal et al. |
| 6,026,141 A | * | 2/2000 | Lo .............................. 377/111 |
| 6,046,646 A | | 4/2000 | Lo et al. |
| 6,144,242 A | | 11/2000 | Jeong et al. |
| 6,147,699 A | | 11/2000 | Berry et al. |
| 6,167,103 A | | 12/2000 | Hardin |
| 6,175,259 B1 | | 1/2001 | Mann et al. |
| 6,205,171 B1 | * | 3/2001 | Yang et al. .................. 375/219 |
| 6,292,507 B1 | | 9/2001 | Hardin et al. |
| 6,366,174 B1 | | 4/2002 | Berry et al. |
| 6,404,834 B1 | | 6/2002 | Hardin et al. |
| 6,476,844 B1 | | 11/2002 | Ream |
| 6,658,043 B2 | | 12/2003 | Hardin et al. |

FOREIGN PATENT DOCUMENTS

| | | |
|---|---|---|
| JP | 62-146018 | 6/1987 |
| JP | 64-44114 | 2/1989 |
| JP | 3-297238 | 12/1991 |
| JP | 04219082 | 8/1992 |
| JP | 04303234 | 10/1992 |
| JP | 5-152908 | 6/1993 |
| JP | 5-268022 | 10/1993 |
| JP | 06303502 | 10/1994 |
| SU | 1372610 A1 | 2/1988 |

OTHER PUBLICATIONS

"Frame Delay Lines Inversion," IBM Technical Disclosure Bulletin, vol. 36, No. 6A (Jun. 1993) 4 pages.

* cited by examiner

METHOD AND APPARATUS FOR REDUCING EMI EMISSIONS FOR DATA SIGNALS TRAVELING OVER A DATA PATHWAY

TECHNICAL FIELD

The present invention relates generally to electronic equipment for reducing electromagnetic energy emissions (EM) of digital data signals and is particularly directed to a modulation scheme that generates multiple EM energy concentrations of lower amplitude in lieu of the originating data signals. The invention is specifically disclosed as a modulating and demodulating system that receives one or more originating data signals, and encodes (e.g., modulates) those data signals into a set of sideband frequencies in a manner that is similar to spreading their frequency spectrum. The encoded signals are sent over a transmission medium (e.g., a communications link) to a receiving station that decodes (e.g., demodulates) the encoded signals in a manner that recreates the original data signals. The modulation (encoding) scheme can be varied for different parallel data signals, or it can be identical with each data line being somewhat out of phase with the other data signals. The modulation (encoding) scheme for each data signal attempts to create multiple sidebands that exhibit maximum amplitudes that are substantially equal to one another, although the frequency of the data is not expected to be perfectly constant to allow for the sidebands to always be truly equal in amplitude. One preferred method for modulating a data signal is to create multiple modulation pattern sets by use of multiple rising edge counters and repeat cycle counters to encode the input data signal in more than one pattern, thereby creating a modulation cycle that is continually repetitive while generating multiple sidebands about the data signal's fundamental frequency and certain harmonics, which exhibit lower amplitudes than the originating data signal.

BACKGROUND OF THE INVENTION

High-speed digital clock systems are typically very noisy with regard to electromagnetic interference (EMI) emissions, unless some special care is taken at the design stage of equipment incorporating such clocked systems. One reliable and low-cost method for reducing EMI emissions is to use a "spread spectrum clock," such as one disclosed in U.S. Pat. No. 5,488,627, which discloses a circuit in which the spread spectrum frequencies are varied by use of programmable counters and by information stored in a memory circuit. This U.S. Pat. No. 5,488,627 is assigned to Lexmark International, Inc.

There are several other U.S. patents assigned to Lexmark International, Inc. that deal with spread spectrum clock generation systems, including U.S. Pat. Nos. 5,631,920, 5,867, 524, 5,872,807, 6,167,103, 6,292,507, 6,366,174, 6,404,834, and 6,658,043.

The principles of "spreading" EMI emissions to several frequencies can be applied not only to digital clocks, but also to digital data, even though that data will not be running at a constant frequency. There are two IBM patents that deal with a data transfer system that modulates the data on a plurality of data lines, which are U.S. Pat. Nos. 5,781,742 and 5,793,988. In these IBM patents, a data cable of multiple parallel data lines is connected between a keyboard of a laptop computer and the liquid crystal display (LCD) of the laptop computer. The signals that are to drive the LCD are modulated before they are sent over the flat (data) cable to the display. In this design, a counter of the signal modulator must be fully synchronized with a second counter of the signal demodulator. To accomplish this, a SYNC signal and the system's clock signal are included along with the data signals in the cable that travels between the laptop's keyboard and the display. This is a somewhat inelegant design, because of the additional electrical signals that accompany the data signals along the same communications pathway (for which the EMI emissions are purportedly being reduced), and the fact that one of these additional signals includes the actual clock signal itself. In other words, the clock signal travels on the same bus as the data signals, and thus a non-modulated clock signal is being transmitted right along with the modulated data signals. This would not be the preferred way to attempt to reduce EMI for a particular data pathway system.

Another patent that deals with modulating data signals, rather than clock signals, is U.S. Pat. No. 6,476,844, assigned to Lexmark International, Inc. In this patent the video data for driving a laser diode of a laser printer is divided into two different signals, which are transmitted over a pair of wires, and later recombined before arriving at the laser diode. The binary data that represents the image data is thus encoded, and this encoding is dependent upon the image signal data content. The encoded data signals have a switching rate that is lower than the initial switching rate of the originating video data signal. On the receiving end, the image data signal is then recreated before driving the laser diode. In one embodiment, the recombination device is an exclusive-OR gate. The encoding logic is fairly simple, such that one of the encoded signals makes a transition only upon positive-going (or rising) transitions of the originating video signal, while the second encoded signal makes transitions only upon falling (or negative-going) transitions of the originating data signal.

While the above-discussed patents will tend to reduce the overall EMI emissions in a digital data signal system, it would be an improvement to utilize a more sophisticated modulating (or encoding) scheme in a manner that will reduce the overall EMI emissions to a greater extent.

SUMMARY OF THE INVENTION

Accordingly, it is an advantage of the present invention to provide a data signal encoding or modulation system to reduce electromagnetic emissions of a data signal in a manner that creates concentrations of electromagnetic energy at "sideband" frequencies about the fundamental frequency and certain harmonic frequencies of the originating data signals.

It is another advantage of the present invention to provide a data signal encoding or modulation system to reduce the electromagnetic emissions of a data signal by modulating the data signal using a scheme that creates multiple sets of sidebands about the fundamental and certain harmonic signals, in a manner such that each of the groups of sidebands exhibits a maximum amplitude that is substantially the same as the maximum amplitude of the other sidebands for that fundamental or harmonic frequency of the originating data signal.

It is yet another advantage of the present invention to provide a data signal encoding or modulation scheme for reducing electromagnetic emissions of a data signal in a manner that allows for only the encoded or modulated data signals to be transmitted over a data pathway or communications link to a receiving station, where the signals are then demodulated (or decoded) to recreate the original data signal content.

It is still another advantage of the present invention to provide a data signal encoding or modulation system for reducing electromagnetic emissions of a data signal by providing a modulation or encoding scheme that allows either single lines of data to be modulated and later demodulated, or will allow multiple, parallel lines of data signals to be modulated and later demodulated, in which the modulation schemes for each of the parallel signals can be completely different from one another, or in which the modulation scheme is essentially the same for all data signals, but the modulation cycles are out of phase from one another.

Additional advantages and other novel features of the invention will be set forth in part in the description that follows and in part will become apparent to those skilled in the art upon examination of the following or may be learned with the practice of the invention.

To achieve the foregoing and other advantages, and in accordance with one aspect of the present invention, a method for reducing electromagnetic emissions of data signals is provided, in which the method comprises the following steps: (a) providing a controller having a first input, a modulating circuit, and a first output; (b) providing a demodulating circuit, having a second input, and a second output; (c) providing a data pathway between the first output and the second input; (d) receiving an input data signal at the first input; (e) repetitively modulating, at the modulating circuit, the input data signal according to a predetermined modulation cycle, in which the modulation cycle comprises at least one modulating pattern set, thereby generating a first output data signal that is directed to the first output; (f) transmitting the first output data signal from the first output to the data pathway; (g) receiving the first output data signal from the data pathway at the second input; and (h) demodulating, at the demodulating circuit, the first output data signal, thereby generating a second output data signal that is directed to the second output, wherein a data content of the second output data signal corresponds to a data content of the input data signal.

In accordance with another aspect of the present invention, a method for reducing electromagnetic emissions of data signals is provided, in which the method comprises the following steps: (a) providing a controller having an input, a modulating circuit, and an output; (b) receiving an input data signal at the input; (c) repetitively modulating, at the modulating circuit, the input data signal according to a predetermined modulation cycle, in which the modulation cycle comprises at least two modulating pattern sets, thereby generating an output data signal that is directed to the output.

In accordance with yet another aspect of the present invention, an electronic controller for reducing electromagnetic emissions of data signals is provided, which comprises: (1) a first input that receives an input data signal; (2) a modulating circuit, comprising: (a) a processing circuit that counts a number of transitions of a predetermined type of the input data signal, and that counts a number of repeat cycles of the transitions, and generates a modulation control signal; (b) a plurality of logic gates and multiplexers that receive the modulation control signal, and the data input signal, and manipulate the data input signal in a manner that generates concentrations of electromagnetic energy emissions near a frequency of the data input signal, thereby creating a first output data signal; and (3) a first output that transmits the first output data signal.

Still other advantages of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
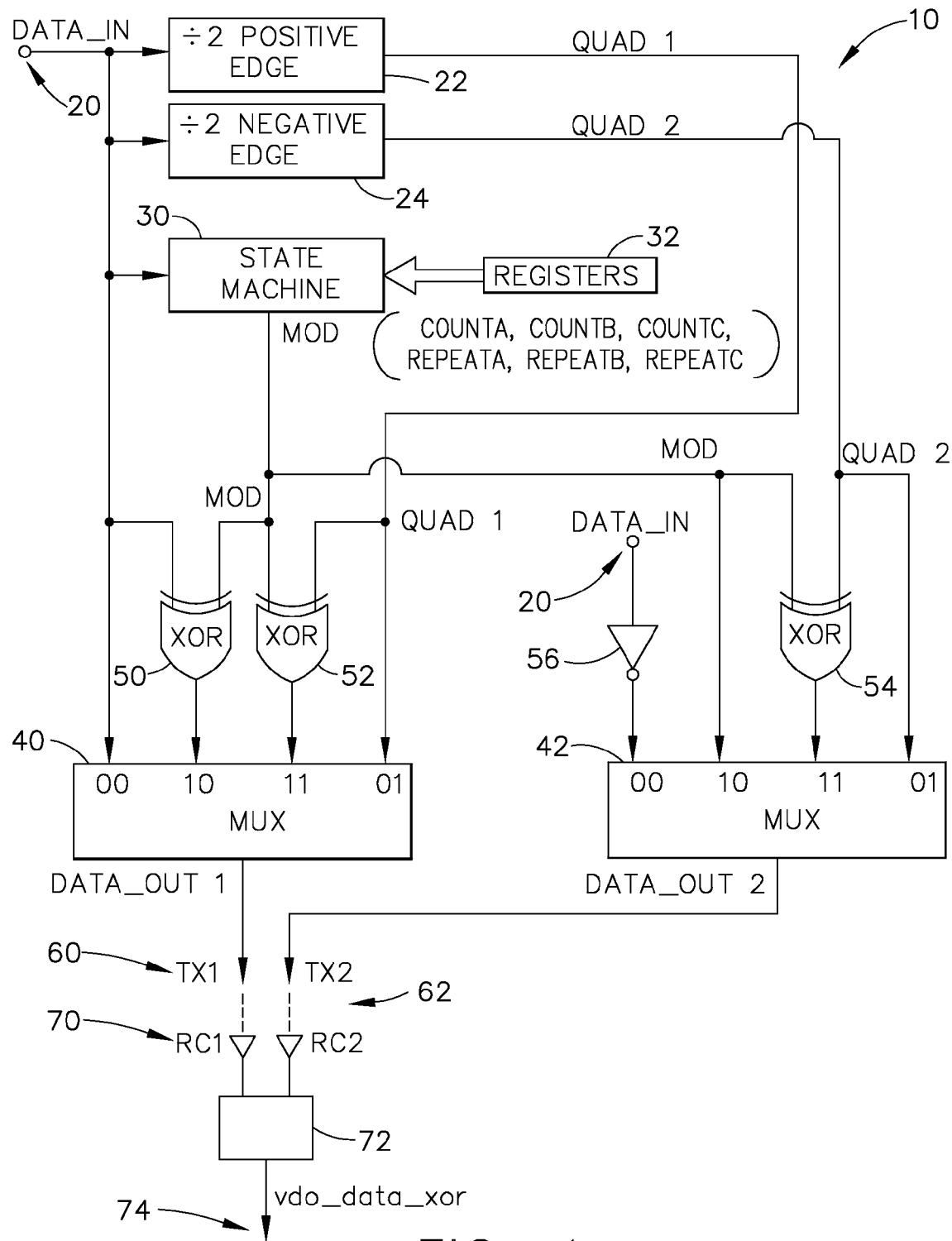
FIG. 1 is a block diagram of some of the electronic elements used in a circuit that is constructed according to the principles of the present invention.

Referring now to the drawings, FIG. 1 shows a block diagram of electronic hardware components, in which the overall circuit is generally designated by the reference numeral 10. The input data to the circuit 10 comes in at a node 20, and is referred to on FIG. 1 as "DATA_IN." The input data is directed to several different places in the circuit.

The input data signal is directed to a logic gate or flip-flop 22 that switches only at the rising edges of the input data signal 20 (as the signal makes logic level transitions). The output signal from gate 22 is referred to on FIG. 1 as "QUAD 1." The input data signal is also directed to a second electronic gate or flip-flop 24 that switches only at the falling edges of the input data signal. This output from gate 24 is referred to on FIG. 1 as "QUAD 2." The general effect of these two logic elements 22 and 24 is to create a quadrature set of data signals (i.e., QUAD 1 and QUAD 2) that are used at other places in the electronic circuit 10. Note that the signals QUAD 1 and QUAD 2 are sometimes referred to herein as being data signals that have been "divided by two," since they make state transitions only half as often as the original input data signal 20.

Figure 2:
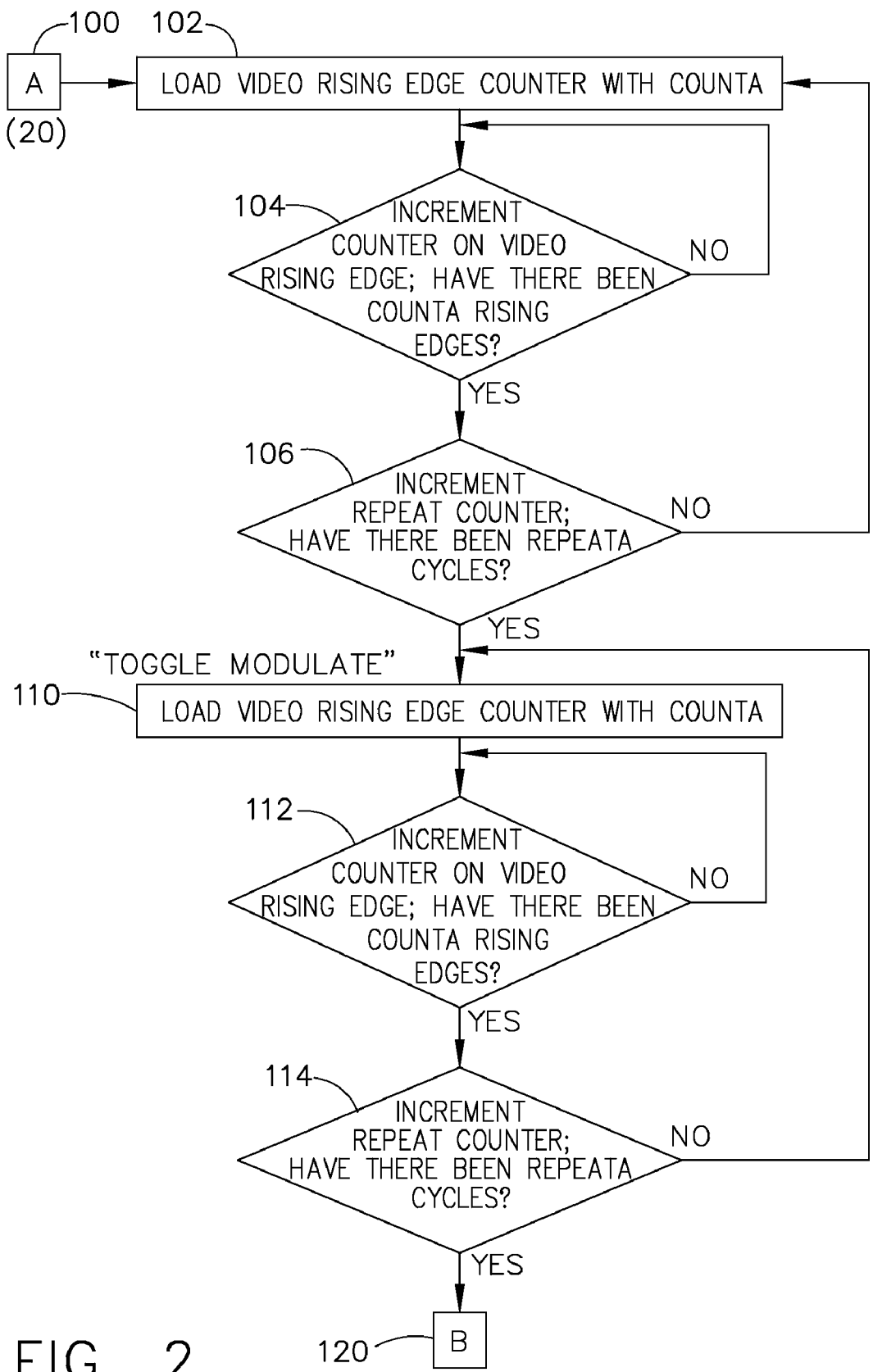
FIG. 2 is a flow chart of a portion of the state machine logic used in an example design of the present invention.
Figure 3:
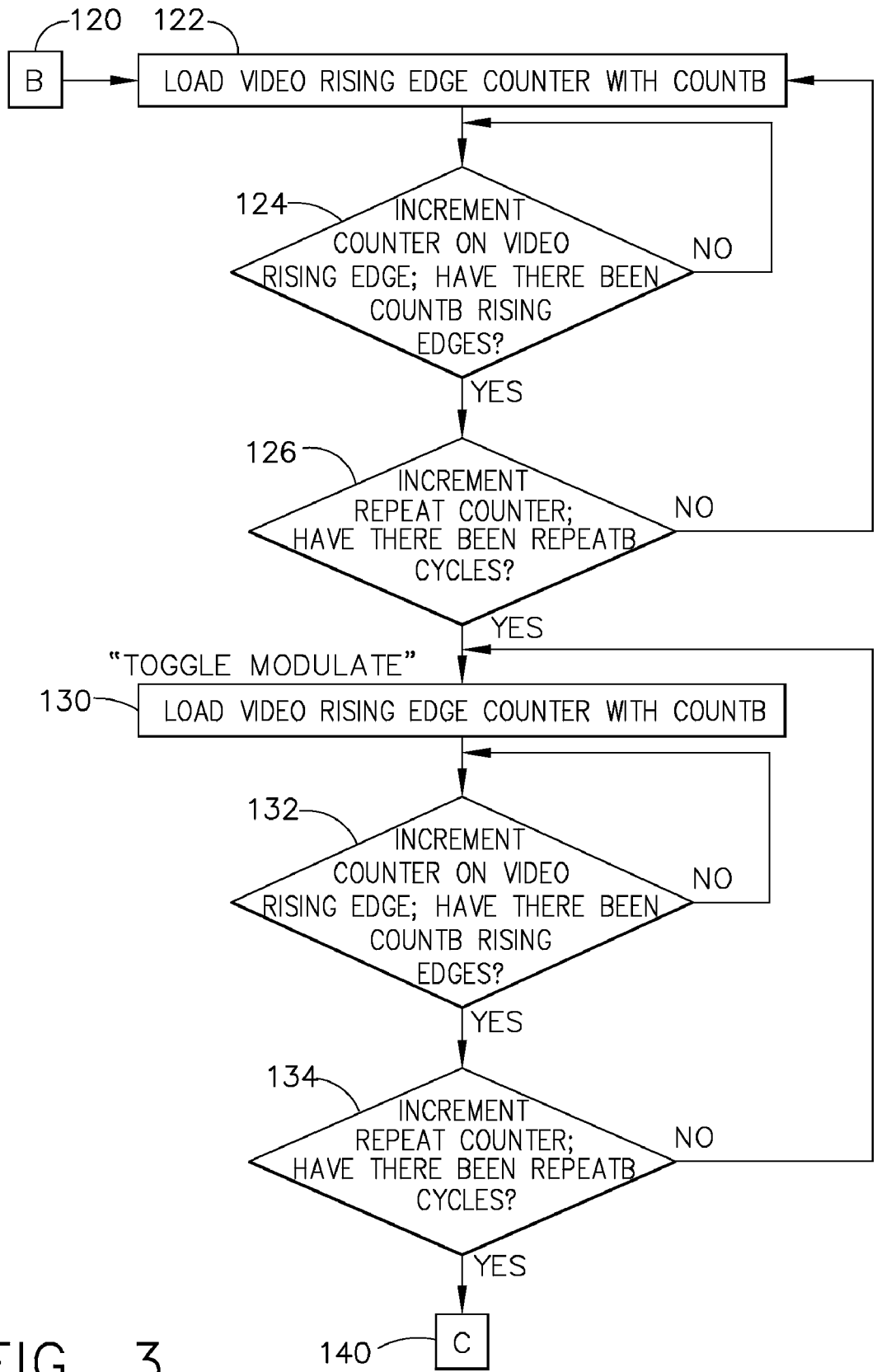
FIG. 3 is a flow chart of a portion of the state machine logic used in an example design of the present invention.
Figure 4:
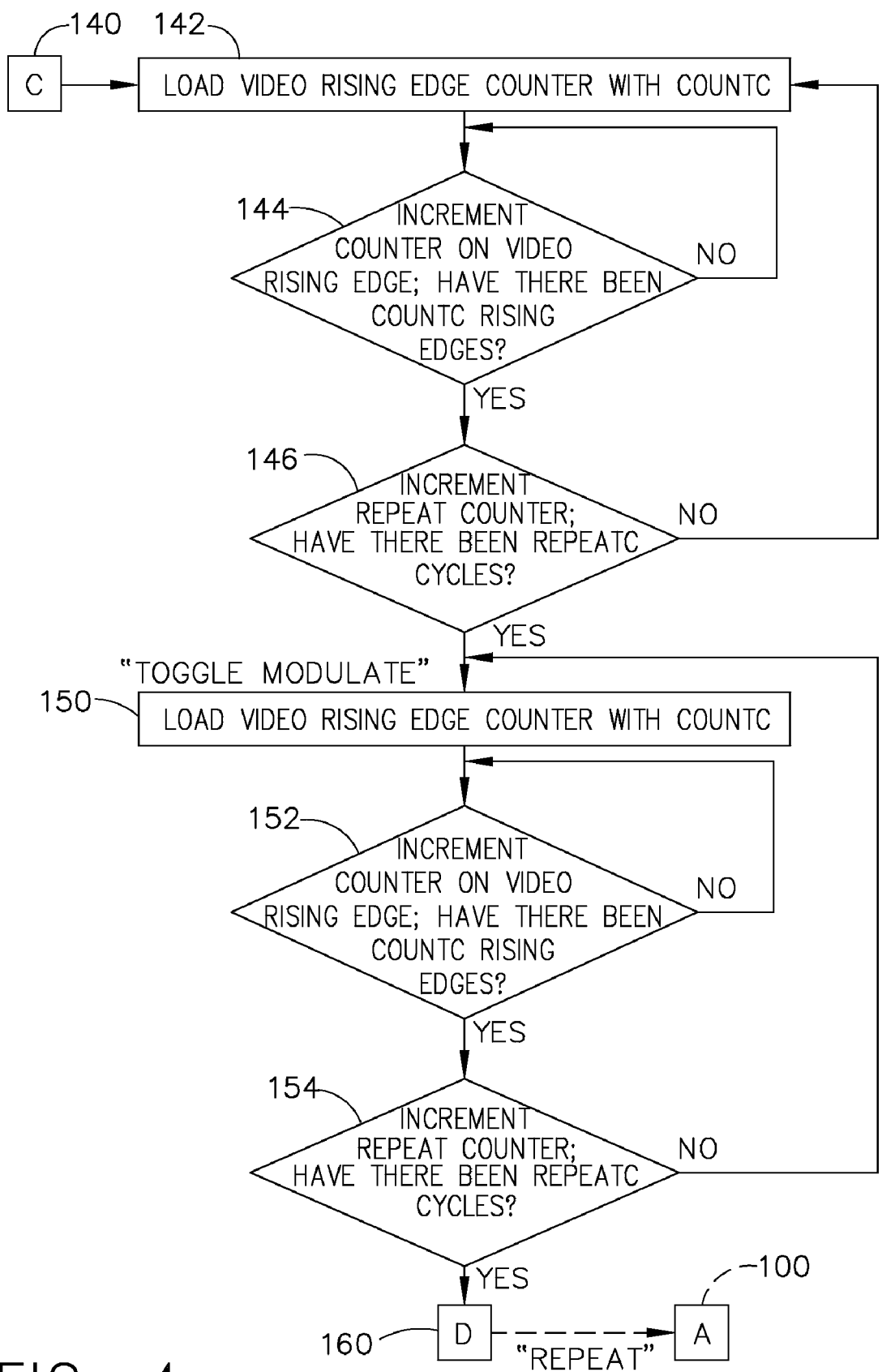
FIG. 4 is a flow chart of a portion of the state machine logic used in an example design of the present invention.

The input data signal 20 is also directed to a logic state machine 30, that performs many logic functions, as depicted on the flow charts illustrated in FIGS. 2-4. In general, the state machine 30 contains logic that enables the state machine to act as a rising edge counter, a repeat cycle counter, and a "modulation cycle" counter, based upon values that are loaded into registers 32, in which the contents of these registers 32 are provided to the state machine 30.

It should be noted that, while a preferred embodiment of the present invention uses "rising" edges of certain data signals to make some logical decisions, the use of "falling" edge signals instead of rising edge signals would work equally well, without departing from the principles of the present invention. In general, many of the logical operations of the present invention are based upon signal "transitions," which could be either rising or falling edges of the appropriate signals. Moreover, the data signals could be digitized and converted to binary numbers, for example, and the principles of the present invention could be used to inspect certain types of numeric transitions in those binary numbers.

In the example illustrated herein, state machine 30 uses three sets of rising edge counters and three sets of repeat cycle counters, and the overall general effect of this logic is to create three different sets of modulation patterns, that will also be referred to herein as "modulation pattern sets." In general, the state machine logic will cause the input data 20 to be modulated at a first modulation pattern set A, which will create a set of sidebands having a generally predetermined known set of frequencies, and then will modulate at a second modulation pattern set B, which will create another set of sidebands at another set of generally predetermined frequencies, and finally will modulate at a third modulation pattern set C that will create a third set of sidebands at a third set of generally predetermined frequencies.

After all three sets of modulation pattern sets A-C have occurred, the state machine 30 will then end this "modulation cycle" and then repeat the entire set of modulation pattern sets. It will be understood that any number of modulation pattern sets could be used within the principles of the present invention, and the actual sideband frequency bandwidths and separation frequencies could also be varied as compared to that described herein, while still falling within the principles of the present invention.

When discussing "sidebands" herein, it will be understood that the effect of modulating the data signal using the present invention will remove electromagnetic energy from the "center" frequency of the data signal, and "spread" the EM energy emissions to other frequencies as concentrations of this EM energy near the "center" frequency and odd-numbered harmonics. These energy concentrations appear to be "sides" of the original center frequency and harmonics on a frequency spectrum graph, and hence are also called sidebands herein.

The registers 32 in the example described above will contain three "count" registers and three "repeat" registers, which are referred to herein as CountA, CountB, CountC, RepeatA, RepeatB, and RepeatC. The contents of these registers could be controlled by a separate processor device, such as a microcontroller or microprocessor of a laser printer or an ink jet printer, for example. Any type of processing device could be used to load and update or otherwise change the numeric values within these registers, or, for example, the numeric values of the registers could be "hard-wired," such that their values would never change. It will be understood that, if the number of modulation pattern sets is increased to four or five, for example, then there typically would be five sets of "count" registers and five sets of "repeat" registers.

The output signal from state machine 30 is a "modulate" signal that is referred to on FIG. 1 as "MOD." This MOD signal is directed to several other portions (such as logic gates) of the electronic circuit 10. For example, the MOD signal is directed to an exclusive-OR gate 50, and also an exclusive-OR gate 52, which both have an output feeding into a multiplexer 40. The QUAD 1 signal is also directed to multiplexer 40, as well as to the other input of the XOR gate 52. The DATA_IN signal 20 is also directed to multiplexer 40, as well as to the XOR gate 50.

The MOD signal is also directed to another exclusive-OR gate 54, as well as to an input of another multiplexer 42. The QUAD 2 signal is also directed to the XOR gate 54, and the output of this gate 54 is directed to multiplexer 42. The QUAD 2 signal is also directly input to multiplexer 42. Finally, an inverted DATA_IN signal is directly input to multiplexer 42, by running the data input signal 20 through a logic inverter 56.

The four input signals to multiplexer 40 act as control signals that will determine the operating characteristics of multiplexer 40. Each of the multiplexers 40 and 42 have four inputs labeled "00", "10", "11", and "01". In the case of the multiplexer 40, the 00-input is actuated directly by the input data signal 20, the 01-input is directly actuated by the QUAD 1 signal that is output by the logic element 22, the 10-input is actuated by the XOR gate 50, which has the data input signal and the MOD signal as its inputs, while the 11-input is actuated by the output of XOR gate 52, which itself is actuated by the MOD signal and the QUAD 1 signal. In effect, multiplexer 40 operates with the "normal" data input signal when input-00 is active ("mode 00"), which is also sometimes referred to herein as the "normal video" data signal. (This assumes that the input data is some type of high-speed signal such as would be used with a video system, such as a video monitor or display; or for creating bitmaps used in laser printers or ink jet printers, in which their driving signals are also referred to as "video" signals.) It will be understood that, for the purposes of this detailed description, the term "video signal" refers to any type of data signal, high-speed or otherwise.

If the 01-input ("mode 01") is actuated, then multiplexer 40 will operate in a divide-by-2 mode (e.g., a "quadrature" mode) without modulation; if the input-10 ("mode 10") is actuated, then multiplexer 40 will produce the video data signal with modulation, and if the input-11 ("mode 11") is actuated, then multiplexer 40 will produce a modulated video data signal that is also divided by two (again, in a "quadrature" mode). In any event, the output signal from multiplexer 40 is referred to on FIG. 1 as the "DATA_OUT1" signal. These control modes may be altered during operation of the controller, if desired.

The control logic for the second multiplexer 42 is similar, in which the inverted input data signal is directed to the "00" input of MUX 42, and the other quadrature signal "QUAD 2" is directed to the "01" input. However, MUX 42 has different input logic, in which the MOD signal is directly input to the "10" input, and the XOR gate 54 has its output directed to the "11" input. In this situation, MUX 42 will respond directly to the input data when the input-00 is actuated, will divide the input data by two when the input-01 is actuated, will respond to the MOD signal directly when the 10-input is actuated, and will modulate the video signal while dividing by two when the input-11 is actuated. In any event, the output signal from MUX 42 is referred to on FIG. 1 as "DATA_OUT2."

The two "modulated" output signals from the MUXes 40 and 42 become "transmission" signals of a sort, because they are now to be directed through a cable or some type of communication channel before being received at the "far end" of the cable run, at which time they are then demodulated. On the transmission end of FIG. 1, the two DATA_OUT signals are referred to as "TX1" and "TX2", respectively, for DATA_OUT1 and DATA_OUT2, and these TX1,2 signals are referred to as a group by the reference numeral 60. On the receive end, the signals are referred to as "RC1" and "RC2", and are referred to as a group by the reference numeral 70. The transmission line or communications channel between the transmission signal 60 and the received signal 70 is referred to as the "channel" 62 on FIG. 1.

At the receive end, the two receive signals RC1 and RC2 are directed as inputs to a logic element 72 (such as an exclusive-OR gate), which has an output at 74 that is referred to as "vdo_data_xor." It should be noted that logic element 72 can comprise an exclusive-OR (XOR) gate or an exclusive-NOR (XNOR) gate in the present invention. Moreover, when operating in the "00-mode" (which is a "direct data mode", or a "normal data signal mode"), the logic element 72 can comprise a differential receiver. Other types of logic gates or receiver devices could also be used in the present invention, or combinations of logic elements, while still falling within the scope contemplated by the inventors.

The logic for the state machine 30 in one embodiment of the present invention is described in detail in the flow charts of FIGS. 2-4. The overall result of this logic will now be described before getting into the detailed description of those flow charts. As discussed above, the registers 32 have three "count" registers and three "repeat" registers, which are grouped in pairs. In other words, the CountA register is paired with the RepeatA register; the CountB and RepeatB registers are paired; and the CountC and RepeatC registers are paired. These pairs of registers are also referred to in this description as "CountX" and "RepeatX" registers, to further emphasize that there could be any number of such pairs of Count and Repeat registers.

As noted above, in this description, it is assumed that there are three sets or pairs of these Count/Repeat registers. The state machine 30 runs logic that utilizes the CountX and RepeatX registers as pairs in succession, and then repeats that succession at the end of each complete cycle. For example, the cycle would start with CountA and RepeatA, then move to CountB and RepeatB, and then move to CountC and RepeatC. This would be one complete "modulation cycle," after which the logic would then resume with CountA and RepeatA, then CountB and RepeatB, then CountC and RepeatC, etc. As noted above, each of these CountX and RepeatX functions are referred to as "modulation pattern sets." The physical result of using these modulation pattern sets is that the data signal that is input to the circuit at node 20 will be modulated on the transmission end to create distinct patterns of energy that can be referred to as "sidebands" in electromagnetic energy interference (EMI) or electromagnetic energy reduction (EMR) terminology. As will be described below in more detail, one aspect of the present invention is to attempt to create energy patterns that are substantially equal in amplitude for each of the modulation pattern sets "CountX/RepeatX."

As a further embellishment of an example that uses three sets of CountX/RepeatX registers, if CountA equals 5 and RepeatA equals 6, then the MOD signal will be "low" for five video pulses, and then "high" for the next five video pulses (due to CountA=5). This pattern will occur six times (which stands for the "Repeat" aspect of the RepeatA register). After that modulation pattern set has occurred, then the MOD signal will be set low for CountB pulses, and then high for CountB pulses. This pattern will then occur for RepeatB number of times, which finishes the second modulation pattern set. Finally, the MOD signal will be set low for CountC pulses and then high for CountC pulses, and this pattern will occur for RepeatC times, thus ending the third modulation pattern set. This completes one entire modulation cycle (since X=3 in this example), which will then immediately begin again with the CountA and RepeatA register values for the next modulation pattern set.

It will be understood that the use of modulations on data signals will have an effect such that the exact sideband energy patterns will not be precisely predictable. If, for example, the present invention was used on a clock signal that was always running at a given frequency and duty cycle, then the energy patterns created by the modulations would indeed be substantially precise. However, with data signals, even certain types of "video" data that has much repeatability, one cannot guarantee that over time the sidebands will always have precisely the same energy distributions with regard to dB amplitudes. However, one can still attempt to achieve that result by using the principles of the present invention.

In the above-related example by which there are three modulation pattern sets in one complete modulation cycle, there will be three concentrations of energy exhibited on either side of the data signal's "center" frequency, as well as for each of the odd-numbered harmonics of the data signal's center frequency. By producing such results, the present invention can be used to substantially reduce the overall electromagnetic interference (EMI) for many types of high-speed data signals. Note that the so-called "center" frequency of the data signal is really the overriding factor here: if the data transitions truly occur at a constant frequency for a given time period (e.g., for an entire modulation cycle), then the sidebands produced by the present invention will be substantially predetermined—but only during that same time period. Once the rate of data transitions changes, then so will the sideband frequencies.

As noted above, FIGS. 2-4 are flow charts that represent the logic used inside state machine 30 for a pattern of three modulation sets that make up a single repeatable modulation cycle. As noted above, the use of the registers that have values loaded therein for count values and repeat values can allow the values to be manipulated by some type of processing device while the system is operating, or the processing device can merely load the counters with values at the beginning of operation and thereafter leave those values alone. Moreover, each pair of count and repeat values (also referred to herein as CountX/RepeatX) can have any number of modulation pattern sets for a desired peak energy reduction application, without departing from the principles of the present invention.

Referring now to FIG. 2, the logic flow starts at a block 100, also referred to as block "A" on FIG. 2. This represents the location where the data input signal will physically enter the logic in a sense, although in the flow charts of FIGS. 2-4, the logic lines and boxes are not necessarily referring to physical signals and electronic elements per se, but refer to logic patterns that can be established using various types of logic gates. On the other hand, it may be helpful to the reader to assume that the node 100 represents the data input signal having rising edges and falling edges, since those very edges (transitions) are used by the logic within state machine 30.

A logic step 102 loads a "video rising edge counter" with "CountA," which is a numeric value (provided by a processing device, if desired). Typically, this would occur upon a power on reset (POR) condition for a given electronic controller apparatus. The logic flow is now directed to a decision step 104 that increments the video rising edge counter upon the next video rising edge occurrence. Decision step 104 then asks, "have there yet been CountA rising edge transitions?" (Note that this question in step 104 could just as easily have been looking for other types of data signal transitions, such a falling edges or certain types of numeric value transitions. The same is true for other similar logical decision steps discussed below, including steps 112, 124, 132, 144, and 152.) If the answer is NO at step 104, then the logic flow is directed back to the input side of decision step 104, awaiting the next rising edge to occur. If the answer is YES, then the logic flow proceeds to the next logic step.

The next logic step is a decision step 106, which controls and increments a "repeat counter." It determines if there have been RepeatA cycles as of yet, and if the answer is NO, then the logic flow is directed back to step 102. If the answer is YES, then the logic flow is directed to the next logic step and "toggles" the modulate signal "MOD".

The next step in the state machine logic is a step 110 that loads the video rising edge counter with the value CountA (e.g., "3") again. After that occurs, a decision step 112 increments the video rising edge counter upon detecting a video signal rising edge. Decision step 112 then determines if there have yet been CountA "clocks" or signal pulses. If the answer is NO, then the logic is directed back to the input side of decision step 112, awaiting the next rising edge. If the answer is YES, then the logic flow is directed to the next logic step.

The next logic step is a decision step 114 that increments the repeat counter, and then determines if there has yet been RepeatA cycles of signal pulses. If the answer is NO, then the logic flow is directed back to the input side of logic step 110, and the video rising edge counter is re-loaded with the value CountA. On the other hand, if the result is YES, then the logic flow is directed to a box B at reference numeral 120, and the modulate signal MOD is then again toggled. The logic flow now is directed to FIG. 3.

Referring now to FIG. 3, the logic flow has arrived at box B (at reference numeral 120) and is now directed to a logic step 122. A logic step 122 loads a "video rising edge counter" with "CountB," which is a numeric value (provided by a processing device, if desired). Typically, this would occur upon a power on reset (POR) condition for a given electronic controller apparatus. The logic flow is now directed to a decision step 124 that increments the video rising edge counter upon the next video rising edge occurrence. Decision step 124 then asks, "have there yet been CountB clocks or signal pulses?" If the answer is NO, then the logic flow is directed back to the input side of decision step 124, awaiting the next rising edge to occur. If the answer is YES, then the logic flow proceeds to the next logic step.

The next logic step is a decision step 126, which controls and increments a "repeat counter." It determines if there have been RepeatB cycles as of yet, and if the answer is NO, then the logic flow is directed back to step 122. If the answer is YES, then the logic flow is directed to the next logic step and "toggles" the modulate signal "MOD".

The next step in the state machine logic is a step 130 that loads the video rising edge counter with the value CountB (e.g., "5") again. After that occurs, a decision step 132 increments the video rising edge counter upon detecting a video signal rising edge. Decision step 132 then determines if there have yet been CountB "clocks" or signal pulses. If the answer is NO, then the logic is directed back to the input side of decision step 132, awaiting the next rising edge. If the answer is YES, then the logic flow is directed to the next logic step 134.

Decision step 134 increments the repeat counter, and then determines if there has yet been RepeatB cycles of signal pulses. If the answer is NO, then the logic flow is directed back to the input side of logic step 130, and the video rising edge counter is re-loaded with the value CountB. On the other hand, if the result is YES, then the logic flow is directed to a box C at reference numeral 140, and the modulate signal MOD is then again toggled. The logic flow now is directed to FIG. 4.

Referring now to FIG. 4, the logic flow for state machine 30 has arrived at box C (at reference numeral 140) and is now directed to a logic step 142. A logic step 142 loads a "video rising edge counter" with "CountC," which is a numeric value (provided by a processing device, if desired). Typically, this would occur upon a power on reset (POR) condition for a given electronic controller apparatus. The logic flow is now directed to a decision step 144 that increments the video rising edge counter upon the next video rising edge occurrence. Decision step 144 then asks, "have there yet been CountC clocks or signal pulses?" If the answer is NO, then the logic flow is directed back to the input side of decision step 144, awaiting the next rising edge to occur. If the answer is YES, then the logic flow proceeds to the next logic step.

The next logic step is a decision step 146, which controls and increments a "repeat counter." It determines if there have been RepeatC cycles as of yet, and if the answer is NO, then the logic flow is directed back to step 142. If the answer is YES, then the logic flow is directed to the next logic step and "toggles" the modulate signal "MOD".

The next step in the state machine logic is a step 150 that loads the video rising edge counter with the value CountC (e.g., "7") again. After that occurs, a decision step 152 increments the video rising edge counter upon detecting a video signal rising edge. Decision step 152 then determines if there have yet been CountC "clocks" or signal pulses. If the answer is NO, then the logic is directed back to the input side of decision step 152, awaiting the next rising edge. If the answer is YES, then the logic flow is directed to the next logic step 154.

Decision step 154 increments the repeat counter, and then determines if there has yet been RepeatC cycles of signal pulses. If the answer is NO, then the logic flow is directed back to the input side of logic step 150, and the video rising edge counter is re-loaded with the value CountC. On the other hand, if the result is YES, then the logic flow is directed to a box D at reference numeral 160, and the modulate signal MOD is then again toggled.

Now that the logic flow has arrived at box D, it will then "repeat" back to box A at reference numeral 100 on FIG. 2. As noted above, these flow chart logic steps of FIGS. 2-4 are only to demonstrate the present invention and which describe a three-pattern set of modulation pattern sets; any number of modulation pattern sets could be used to define one complete modulation cycle as a repeatable event.

It will be understood that the type of input signal transitions used for logical decisions in the present invention need not always be for "rising" edge transitions. For example, if "falling" edge transitions were used rather than rising edge transitions, the invention would work in a similar manner. A combination of rising-edge or falling-edge transitions could be used, for example, in different modulation patterns sets, if desired. Moreover, logic signals having more than two possible states could also be used, with appropriate changes to the logic decisions in the flow charts.

A listing of exemplary state machine commands for use in conjunction with the above flow charts follows immediately below (which uses rising edge transitions):

```
--$Id: videmc.vhd $
--/*   03/04/03 jr      Put modulate high in count_highX states. Identified by T.Vickers.
--/*   03/04/03 jr      Put reg2_ff to bits 31:30 to agree with spec. Identified by T.Vickers.
--/*   02/20/03jr       Add scan_tst,scan_clk and control_out
library IEEE;
use IEEE.std_logic_1164.all;
use IEEE.std_logic_arith.all;
use IEEE.std_logic_unsigned.all;
--
------------------------------------------------------------------------------------------------
-- vid_emc is used by the emc_top entity to generate the low db emc waveforms
------------------------------------------------------------------------------------------------
package vid_emc_gen is
    component emc_vid
        port (
                        mode            :   in      std_logic_vector(1 downto 0);
                        resetn          :   in      std_logic;
                        video_clk       :   in      std_logic;
                        video_out1      :   out     std_logic;
                        video_out2      :   out     std_logic;
                        counta          :   in      std_logic_vector(5 downto 0);
                        repeata         :   in      std_logic_vector(5 downto 0);
                        countb          :   in      std_logic_vector(5 downto 0);
                        repeatb         :   in      std_logic_vector(5 downto 0);
                        countc          :   in      std_logic_vector(5 downto 0);
                        repeatc         :   in      std_logic_vector(5 downto 0);
                        scan_tst        :   in      std_logic;
                        scan_clk        :   in      std_logic);
    end component;
end vid_emc_gen;
------------------------------------------------------------------------------------------------
------------------------------------------------------------------------------------------------
library IEEE;
use IEEE.std_logic_1164.all;
use IEEE.std_logic_arith.all;
use IEEE.std_logic_unsigned.all;
--use ieee.std_logic_misc.all;
--use ieee.std_logic_textio.all;   -- for hex reads of textio to std_logic
--use std.textio.all;
--library SYNOPSYS;
--use SYNOPSYS.std_logic_arith.all;
--use SYNOPSYS.std_logic_unsigned.all;
------------------------------------------------------------------------------------------------
-- 02/14/03       This generates an emc reduced video
-- 02/20/03       Add scan_tst and scan_clk
------------------------------------------------------------------------------------------------
entity emc_vid   is
  port (        mode            :   in      std_logic_vector(1 downto 0);
                resetn          :   in      std_logic;
                video_clk       :   in      std_logic;
                video_out1      :   out     std_logic;
                video_out2      :   out     std_logic;
                counta          :   in      std_logic_vector(5 downto 0);
                repeata         :   in      std_logic_vector(5 downto 0);
                countb          :   in      std_logic_vector(5 downto 0);
                repeatb         :   in      std_logic_vector(5 downto 0);
                countc          :   in      std_logic_vector(5 downto 0);
                repeatc         :   in      std_logic_vector(5 downto 0);
                scan_tst        :   in      std_logic;
                scan_clk        :   in      std_logic);
end emc_vid;
architecture emc_vid_arch of emc_vid is
    signal      quad1           :   std_logic;
    signal      quad2           :   std_logic;
    signal      modulate        :   std_logic;
    signal      nxt_modulate    :   std_logic;
    signal      state           :   std_logic_vector(2 downto 0);
    signal      nxt_state       :   std_logic_vector(2 downto 0);
    signal      counter :   std_logic_vector(5 downto 0);
    signal      nxt_counter     :   std_logic_vector(5 downto 0);
    signal      repeats :   std_logic_vector(5 downto 0);
    signal      nxt_repeats     :   std_logic_vector(5 downto 0);
    signal      video_clk_n     :   std_logic;
    constant    initial :   std_logic_vector(2 downto 0) := "000";
    constant    counta_high     :   std_logic_vector(2 downto 0) := "001";
    constant    counta_low      :   std_logic_vector(2 downto 0) := "010";
    constant    countb_high     :   std_logic_vector(2 downto 0) := "011";
    constant    countb_low      :   std_logic_vector(2 downto 0) := "100";
    constant    countc_high     :   std_logic_vector(2 downto 0) := "101";
```

-continued

```
        constant     countc_low    :   std_logic_vector(2 downto 0) := "110";
        constant     zero_6        :   std_logic_vector(5 downto 0) := "000000";
        constant     one_6         :   std_logic_vector(5 downto 0) := "000001";
        constant     bypass        :   std_logic_vector(1 downto 0) := "00";
        constant     only_xor      :   std_logic_vector(1 downto 0) := "01";
        constant     mod_xor       :   std_logic_vector(1 downto 0) := "11";
        constant     only_mod      :   std_logic_vector(1 downto 0) := "10";
begin
    quad1_proc : process(resetn,video_clk)
    begin
        if(resetn = '0') then
            quad1 <= '0';
        elsif (video_clk = '1' and video_clk'event) then
            quad1 <= not quad1;
        end if;
    end process quad1_proc;
    -- add this for scan test
    video_clk_n <= not video_clk when scan_tst = '0' else scan_clk;
    quad2_proc : process(resetn,video_clk_n)    -- negative edge clock, use rising edge flops and use inverted clock.
    begin
        if(resetn = '0') then
            quad2 <= '0';
        elsif (video_clk_n = '1' and video_clk_n'event) then
            quad2 <= not quad2;
        end if;
    end process quad2_proc;
    output_mux_proc : process(mode,modulate,quad1,quad2,video_clk)
    begin
        case mode is
            when bypass    =>   video_out1 <= video_clk;
                                video_out2 <= video_clk_n;
            when only_xor  =>   video_out1 <= quad1;
                                video_out2 <= quad2;
            when mod_xor   =>   video_out1 <= modulate xor quad1;
                                video_out2 <= modulate xor quad2;
            when only_mod  =>   video_out1 <= modulate xor video_clk;
                                video_out2 <= modulate;
            when others    =>   video_out1 <= video_clk;
                                video_out2 <= video_clk;
        end case;
    end process output_mux_proc;
    next_state_proc :
process(state,counter,repeats,modulate,counta,repeata,countb,repeatb,countc,repeatc,mode)
    begin
        case state is
            when initial =>        nxt_modulate <= '0';
                                   if ( mode = bypass ) then
                                        nxt_state <= initial;
                                   else
                                        nxt_state <= counta_low;
                                   end if;
                                   nxt_counter <= zero_6;
                                   nxt_repeats <= zero_6;
            when counta_low =>     nxt_modulate <= '0';
                                   if counter >= counta then
                                        nxt_state <= counta_high;
                                        nxt_counter <= zero_6;
                                   else
                                        nxt_state <= counta_low;
                                        nxt_counter <= counter + one_6;
                                   end if;
                                   nxt_repeats <= repeats;
            when counta_high =>    nxt_modulate <= '1';
                                   if counter >= counta then
                                        if ( repeats >= repeata ) then
                                            nxt_state <= countb_low;
                                            nxt_repeats <= zero_6;
                                        else
                                            nxt_state <= counta_low;
                                            nxt_repeats <= repeats + one_6;
                                        end if;
                                        nxt_counter <= zero_6;
                                   else
                                        nxt_counter <= counter + one_6;
                                        nxt_repeats <= repeats;
                                        nxt_state <= counta_high;
                                   end if;
            when countb_low =>     nxt_modulate <= '0';
```

```
                                if counter >= countb then
                                        nxt_state <= countb_high;
                                        nxt_counter <= zero_6;
                                else
                                        nxt_state <= countb_low;
                                        nxt_counter <= counter + one_6;
                                end if;
                                nxt_repeats <= repeats;
                when countb_high =>     nxt_modulate <= '1';
                                if counter >= countb then
                                        if ( repeats >= repeatb ) then
                                                nxt_state <= countc_low;
                                                nxt_repeats <= zero_6;
                                        else
                                                nxt_state <= countb_low;
                                                nxt_repeats <= repeats + one_6;
                                        end if;
                                        nxt_counter <= zero_6;
                                else
                                        nxt_counter <= counter + one_6;
                                        nxt_repeats <= repeats;
                                        nxt_state <= countb_high;
                                end if;
                when countc_low =>      nxt_modulate <= '0';
                                if counter >= countc then
                                        nxt_state <= countc_high;
                                        nxt_counter <= zero_6;
                                else
                                        nxt_state <= countc_low;
                                        nxt_counter <= counter + one_6;
                                end if;
                                nxt_repeats <= repeats;
                when countc_high =>     nxt_modulate <= '1';
                                if counter >= countc then
                                        if ( repeats >= repeatc ) then
                                                nxt_state <= counta_low;
                                                nxt_repeats <= zero_6;
                                        else
                                                nxt_state <= countc_low;
                                                nxt_repeats <= repeats + one_6;
                                        end if;
                                        nxt_counter <= zero_6;
                                else
                                        nxt_counter <= counter + one_6;
                                        nxt_repeats <= repeats;
                                        nxt_state <= countc_high;
                                end if;
                when others    =>       nxt_modulate <= modulate;
                                        nxt_state <= state;
                                        nxt_counter <= counter;
                                        nxt_repeats <= repeats;
        end case;
    end process next_state_proc;
    state_proc : process(resetn,video_clk)
    begin
            if(resetn = '0') then
                    modulate <= '0';
                    state <= initial;
                    counter <= zero_6;
                    repeats <= zero_6;
            elsif(video_clk = '1' and video_clk'event) then
                    modulate <= nxt_modulate;
                    state <= nxt_state;
                    counter <= nxt_counter;
                    repeats <= nxt_repeats;
            end if;
    end process state_proc;
end emc_vid_arch;
-----------------------------------------------------------------------------------------------------------------
-----------------------------------------------------------------------------------------------------------------
library IEEE;
use IEEE.std_logic_1164.all;
use IEEE.std_logic_arith.all;
use IEEE.std_logic_unsigned.all;
--use ieee.std_logic_misc.all;
--use ieee.std_logic_textio.all;    -- for hex reads of textio to std_logic
--use std.textio.all;
--library SYNOPSYS;
--use SYNOPSYS.std_logic_arith.all;
```

```
--use SYNOPSYS.std_logic_unsigned.all;
-------------------------------------------------------------------------------------------------
-------------------------------------------------------------------------------------------------
-- vid_emc.vhd
-- address 00000001 "00" &countb &"00" &repeatb &"00" &counta &"00" &repeata; r/w
-- address 00000010 "000000000000000000" &countc &"00" &repeatc; r/w
-------------------------------------------------------------------------------------------------
-------------------------------------------------------------------------------------------------
entity vid_emc  is
 port (
    reg_datain          :   in      std_logic_vector(31 downto 0);
    reg_dataout         :   out     std_logic_vector(31 downto 0);
    wr_addr             :   in      std_logic_vector(2 downto 0);
    rd_addr             :   in      std_logic_vector(2 downto 0);
    resetn              :   in      std_logic;
    video_clk           :           in      std_logic_vector(3 downto 0);
    emc_video1_out      :   out     std_logic_vector(3 downto 0);
    emc_video2_out      :   out     std_logic_vector(3 downto 0);
    scan_tst            :   in      std_logic; -- '1' means do scan; '0' means operational
    scan_clk            :   in      std_logic;
    use_video2          :   out     std_logic;
    clk                 :   in      std_logic);
end vid_emc;
architecture vid_emc_arch of vid_emc is
    use      work.vid_emc_gen.emc_vid;              -- does xor/modulate using video as clock;
    --
    signal   reg0_ff : std_logic_vector(23 downto 0);
    signal   reg1_ff : std_logic_vector(11 downto 0);
    signal   reg2_ff : std_logic_vector(1 downto 0);
    signal   reg0    : std_logic_vector(31 downto 0);
    signal   reg1    : std_logic_vector(31 downto 0);
    signal   reg2    : std_logic_vector(31 downto 0);
    signal   mode    : std_logic_vector(1 downto 0);
    constant      bypass       :       std_logic_vector(1 downto 0) := "00";
    constant      only_xor     :       std_logic_vector(1 downto 0) := "01";
    constant      mod_xor      :       std_logic_vector(1 downto 0) := "11";
    constant      only_mod     :       std_logic_vector(1 downto 0) := "10";
begin
    U3 : emc_vid
              port map (mode => mode, resetn => resetn, video_clk =>video_clk(3) , video_out1 =>
emc_video1_out(3), video_out2 => emc_video2_out(3),
                      counta => reg0_ff(11 downto 6), repeata => reg0_ff( 5 downto 0), countb
=>reg0_ff(23 downto 18),
                      repeatb =>reg0_ff(17 downto 12) , countc => reg1_ff(11 downto 6) , repeatc =>
reg1_ff(5 downto 0 ), scan_tst =>scan_tst,
                      scan_clk => scan_clk);
    U2 : emc_vid
              port map (mode => mode, resetn => resetn, video_clk =>video_clk(2) , video_out1 =>
emc_video1_out(2), video_out2 => emc_video2_out(2),
                      counta => reg0_ff(11 downto 6), repeata => reg0_ff( 5 downto 0), countb
=>reg0_ff(23 downto 18),
                      repeatb =>reg0_ff(17 downto 12) , countc => reg1_ff(11 downto 6 ) , repeatc =>
reg1_ff(5 downto 0 ), scan_tst =>scan_tst,
                      scan_clk => scan_clk);
    U1 : emc_vid
              port map (mode => mode, resetn => resetn, video_clk =>video_clk(1) , video_out1 =>
emc_video1_out(1), video_out2 => emc_video2_out(1),
                      counta => reg0_ff(11 downto 6), repeata => reg0_ff( 5 downto 0), countb
=>reg0_ff(23 downto 18),
                      repeatb =>reg0_ff(17 downto 12) , countc => reg1_ff(11 downto 6 ) , repeatc =>
reg1_ff(5 downto 0), scan_tst =>scan_tst,
                      scan_clk => scan_clk);
    U0 : emc_vid
              port map (mode => mode, resetn => resetn, video_clk =>video_clk(0) , video_out1 =>
emc_video1_out(0), video_out2 => emc_video2_out(0),
                      counta => reg0_ff(11 downto 6), repeata => reg0_ff( 5 downto 0), countb
=>reg0_ff(23 downto 18),
                      repeatb =>reg0_ff(17 downto 12) , countc => reg1_ff(11 downto 6 ) , repeatc =>
reg1_ff(5 downto 0 ), scan_tst =>scan_tst,
                      scan_clk => scan_clk);
    mode <= reg2_ff(1 downto 0);
    use_video2 <= reg2_ff(1) or reg2_ff(0);
    vid_emc_write : process(resetn,clk)
       begin
            if (resetn = '0' ) then
                     reg0_ff <= "000000000000000000000000";
                     reg1_ff <= "000000000000";
                     reg2_ff <= bypass;
            elsif ( clk = '1' and clk'event ) then
```

-continued

```
            if wr_addr(0) = '1' then
                    reg0_ff(5 downto 0) <= reg_datain(5 downto 0);
                    reg0_ff(11 downto 6) <= reg_datain(13 downto 8);
                    reg0_ff(17 downto 12) <= reg_datain(21 downto 16);
                    reg0_ff(23 downto 18) <= reg_datain(29 downto 24);
            else
                    reg0_ff <= reg0_ff;
            end if;
            if wr_addr(1) = '1' then
                    reg1_ff(5 downto 0) <= reg_datain(5 downto 0);
                    reg1_ff(11 downto 6) <= reg_datain(13 downto 8);
            else
                    reg1_ff <= reg1_ff;
            end if;
            if wr_addr(2) = '1' then
                    reg2_ff <= reg_datain(31 downto 30);
            else
                    reg2_ff <= reg2_ff;
            end if;
        end if;
    end process vid_emc_write;
    -- read logic
    reg0 <=("00" ®0_ff(23 downto 18) &"00" ®0_ff(17 downto 12) &"00" ®0_ff(11
downto 6) &"00" ®0_ff(5 downto 0) ) when rd_addr(0) = '1' else (others => '0');
    reg1 <= ("000000000000000000" ®1_ff(11 downto 6) &"00" ®1_ff(5 downto 0) ) when
rd_addr(1) = '1' else (others => '0');
    reg2 <=( reg2_ff &"000000000000000000000000000000" ) when rd_addr(2) = '1' else ( others =>
'0');
    reg_dataout <= reg0 or reg1 or reg2;
--  end process rd_vid_emc;
end vid_emc_arch;
```

Figure 5:
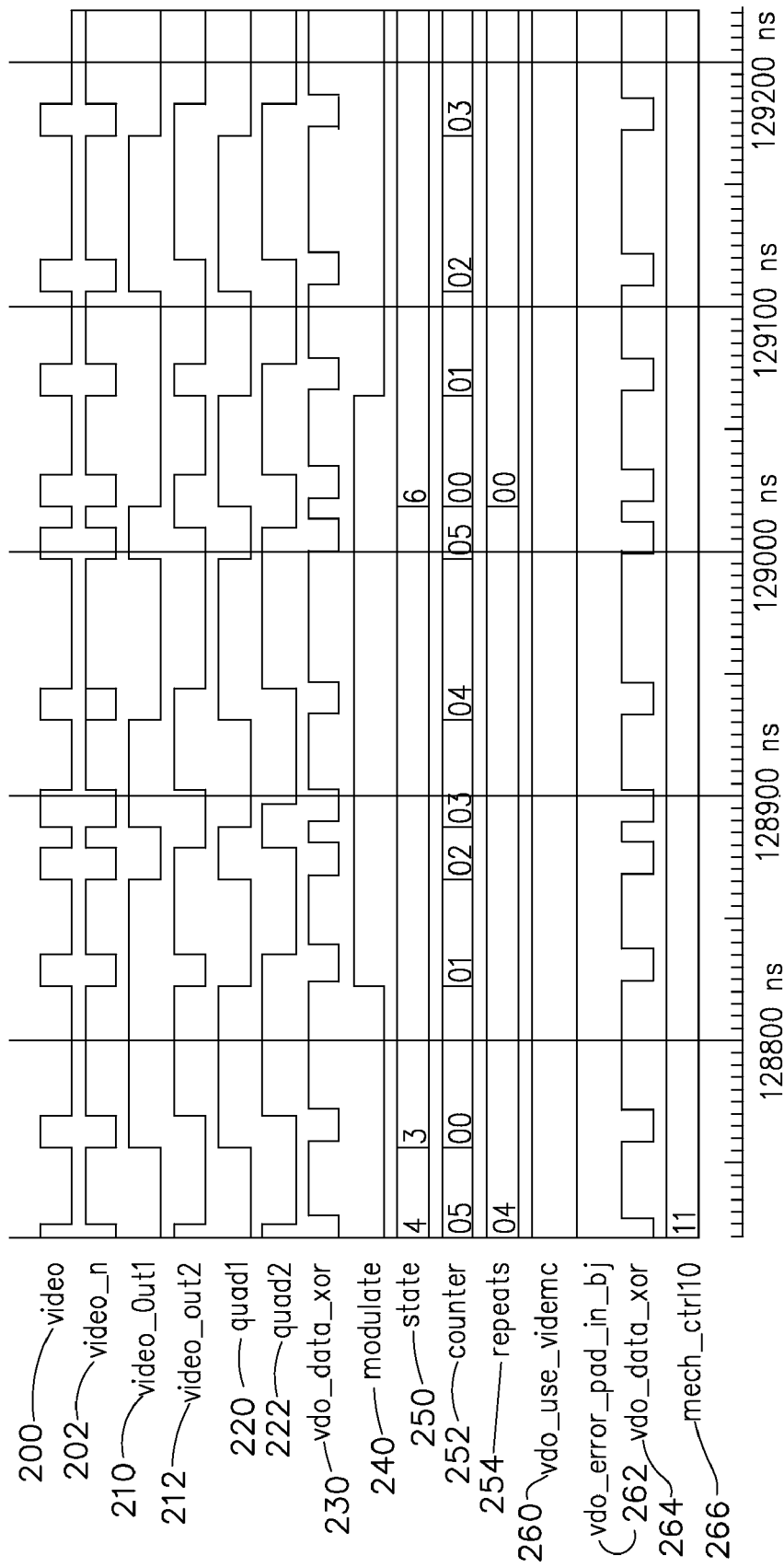
FIG. 5 is a timing diagram that illustrates the output waveform when using the present invention for a particular example set of values in the count and repeat registers, as well as a certain time-slice for the rising edge counters and increment counters (assuming a repeatable input signal).
Figure 6:
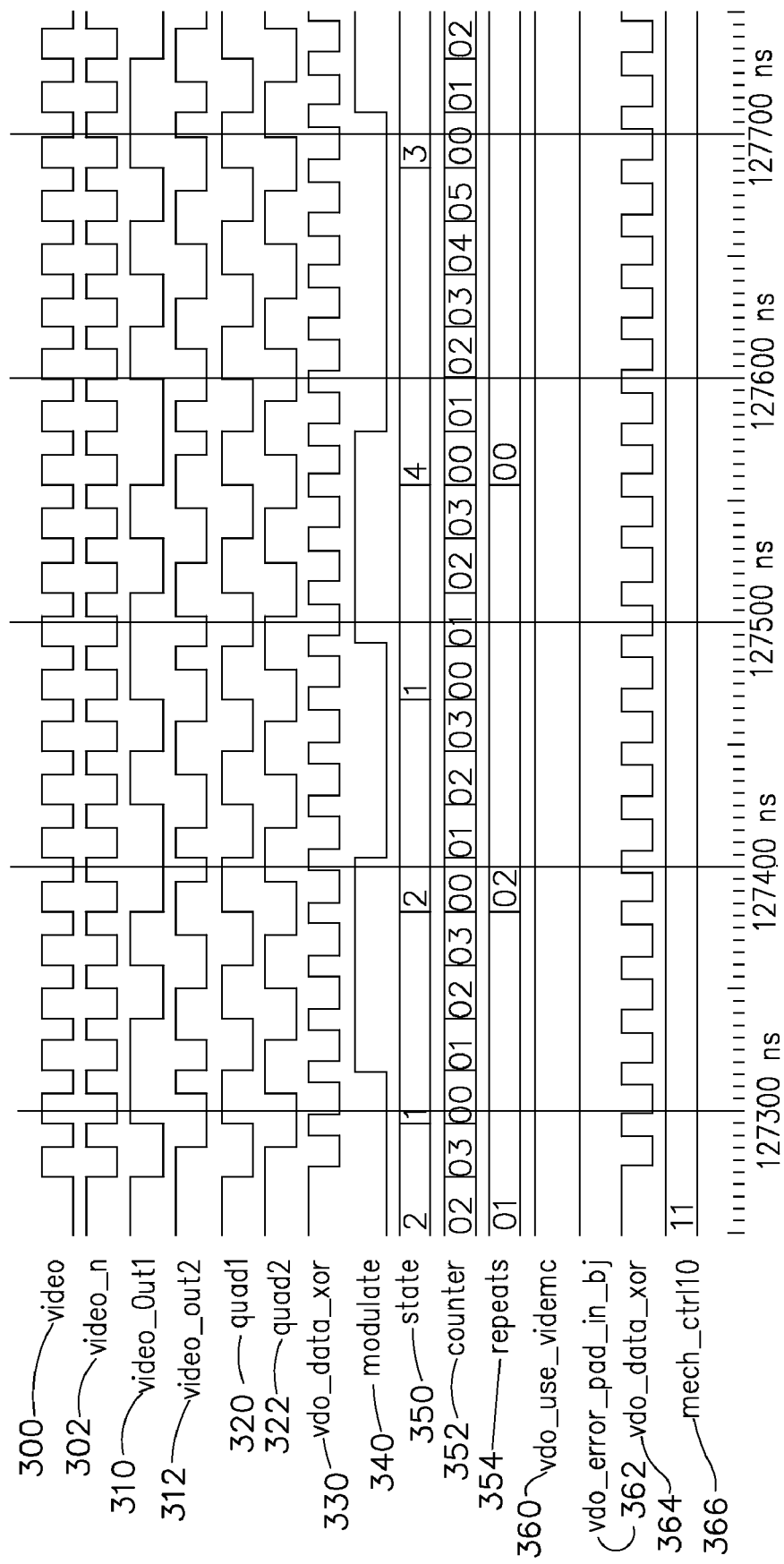
FIG. 6 is a timing diagram that illustrates the output waveform when using the present invention for a particular example set of values in the count and repeat registers, as well as a certain time-slice for the rising edge counters and increment counters, in which a different set of counter and repeat values are illustrated that demonstrate a different portion of the overall modulation cycle (again assuming a repeatable input signal).

Referring now to FIGS. 5 and 6, these figures illustrate timing diagrams that represent two snapshots of a simulation that uses the principles of the present invention, more specifically for VHDL code that was used to define example logic for a state machine 30. On FIG. 5, the signal 200 represents the input data (although it is referred to as "VIDEO", and the signal 202 is the opposite logic "VDO_N" (which is the NOT-VIDEO signal). The VIDEO signal 200 also represents the input data 20 on FIG. 1.

On FIG. 5, there are two video output signals, "VDO_OUT1" and "VDO_OUT2" which are designated by the reference numerals 210 and 212. These represent the signals on FIG. 1 that are called "DATA_OUT1" and "DATA_OUT2," which are the output signals from the multiplexers 40 and 42.

On FIG. 5, the QUAD1 and QUAD2 signals 220 and 222 have the same definitions as on FIG. 1. The VDO_DATA_XOR signal 230 on FIG. 5 has the same definition as the output signal 74 on FIG. 1. The modulate signal 240 on FIG. 5 is the same as the MOD signal on FIG. 1.

In the example of FIG. 5, it is assumed that the logic mode "11" is in effect, the CountA value is "3", the RepeatA value is "2", the CountB value is "5", the RepeatB value is "4", the CountC value is "7", and the RepeatC value is "6". (These numeric values would be loaded into the appropriate registers.)

On FIG. 5, there are three graphs which represent logic elements that contain numeric values rather than outputting signal waveforms, at reference numerals 250, 252, and 254. On FIG. 5, the "state" signal 250 starts with a numeric value of "4", and then changes to a numeric value of "3" upon the first rising edge of the video signal 200. Later, the state signal 250 changes to a value of "6" after six further rising edges of the video signal 200.

The "counter" value 252 starts at a numeric value of "5", then switches to "0" when the state value 250 switches to "3". The counter begins incrementing at each rising edge of the video signal 200, and it can be seen on FIG. 5 that the counter increments through the values of "1" through "5". The count value then is reset to a value of "0" when the state variable 250 is moved to a value of "6". After that occurs, the counter value again begins incrementing upon the occurrence of each rising edge of the video signal 200.

The "repeat" register 252 begins at a numeric value of "4", and remains at that numeric value until it is reset to "0" at the same time as the counter 252 has its value reset to "0" upon the second occurrence of this happening (which is at the time that the state variable 250 is set to a value of "6").

FIG. 5 also shows some values for variables and register values that are internal to the state machine 30. For example, at 260 is a signal "VDO_USE_VIDEMC" that is set to a logic high. Another similar variable at 262 is also set to a logic high, which is the variable "VDO_ERROR_PAD_IN_BJ". A register or memory address element 266 is set to the value of "11", which is referred to as the variable "MECH_CTRL10." This represents the operating mode during this portion of the cycle of the state machine 30.

The output data signal is again presented at 264, which is the same waveform as at 230 on FIG. 5. This is illustrated so that its modulated output results can be more closely compared to the timing marks at the bottom of FIG. 5.

Referring now to FIG. 6, the same signals and register values are depicted as were found in FIG. 5, however, the counter values and repeat values change more rapidly, thus resulting in quite different waveforms. The system is still operating in mode "11", and the CountX and RepeatX registers use the same values as were found and described above in reference to FIG. 5. The VIDEO input signal is now referred to as 300, while its logic opposite is referred to as 302. The video output 1 and 2 signals (VIDEO_OUT_1, VIDEO_OUT_2) are now referred to as 310 and 312, respectively. The QUAD1 and QUAD2 signals are now referred to as 320 and 322, respectively. On FIG. 6, the video output signal (VDO_DATA_XOR) is now 330, the modulate signal is now 340, and the registers or counter values are depicted at 352 and 354. The internal signals are referred to at 360, 362, and 366, and the output signal "VDO_DATA_XOR" is also illustrated at 364.

In FIG. 6, the "state" register begins with a value of "2", then changes to "1" and later back to "2" and again back to "1" after several rising edges of the video input signal 300. Later the state register is moved to a value of "4", and then later a value of "3", once again after several more rising edges of the video input signal 300.

The video rising edge counter value at 352 begins with a value of "2", then moves to "3" at the first rising edge of the video signal 300. This counter 352 changes values upon each rising edge of the video signal 300, and it can be seen that it cycles from values of "0" through "3" in repeatable patterns. Once the state signal is set to a value of "4", then the counter values no longer cycle between "0" and "3", but instead cycle between "0" and "5". This shows one aspect of the present invention, in which the number of repeats affects the numeric values that will be used in the rising edge counters.

The repeats register 354 begins with a value of "1", and then later shifts to a value of "2" when the state variable is set to "2". Later the repeats register is set to a value of "0" when the state variable is set to a value of "4". The output signal 364 is modulated at a much faster rate in FIG. 6 as compared to FIG. 5. In addition, it is running in a different time or frequency domain, as can be seen from the bottom numeric scale in nanoseconds.

Figure 7:
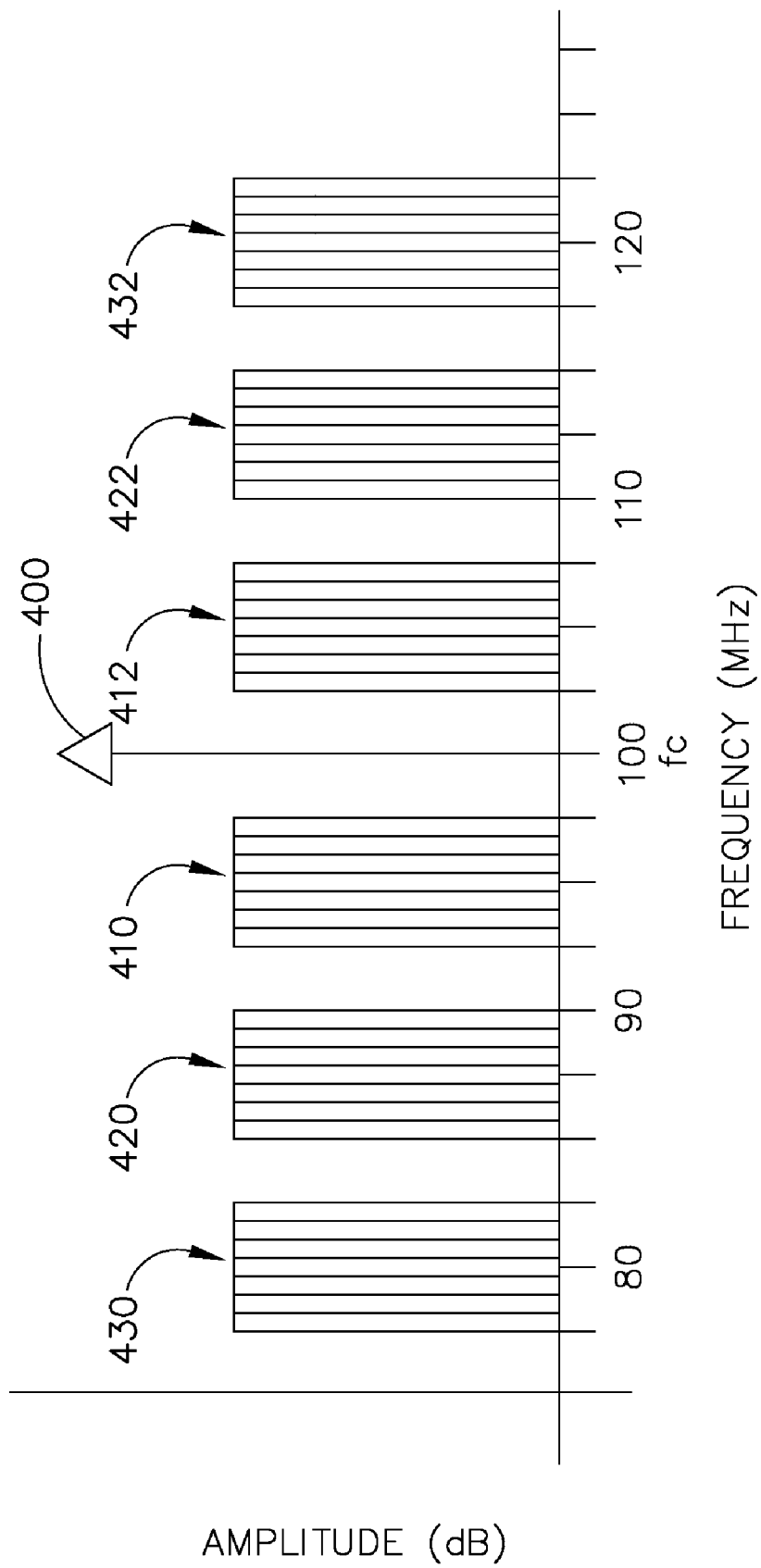
FIG. 7 is a graph showing an energy distribution for a repeatable data signal, using the principles of the present invention.
Figure 8:
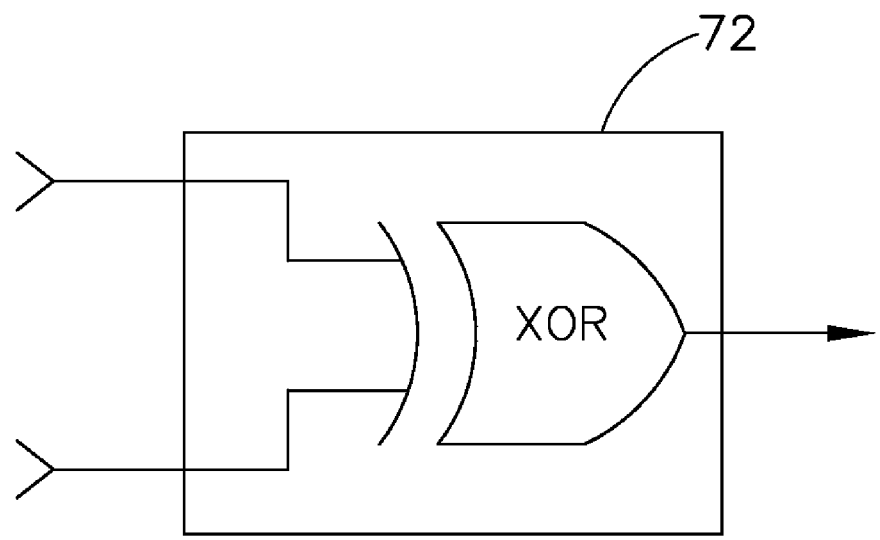
FIG. 8 is a block diagram of a first example demodulation circuit which can be used in the embodiment of the present invention illustrated in FIG. 1.
Figure 9:
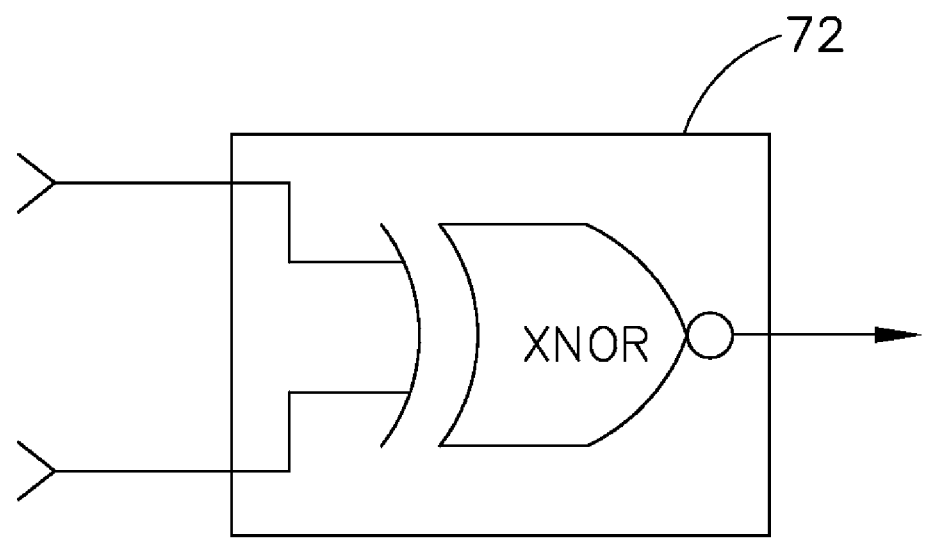
FIG. 9 is a block diagram of a second example demodulation circuit which can be used in the embodiment of the present invention illustrated in FIG. 1.

Referring now to FIG. 7, if the "center" frequency of a data signal is at 100 MHz for example, then the pattern depicted on FIG. 7 could result from using the principles of the present invention. In FIG. 7, the Y-axis represents the amplitude of the energy patterns in decibels (dB), while the X-axis represents frequency in MHz. The "center" frequency $f_c$ is represented by the arrow 400. This represents the amplitude in dB of a non-modulated data signal running at a frequency of 100 MHz. This single peak value will be drastically changed when using the principles of the present invention.

If there are three modulation pattern sets used by the state machine 30, then the EM emissions of the data signal running at 100 MHz will then be modified to exhibit three pairs of concentrations of energy, which are also referred to herein as "sidebands." The first pair of sidebands is designated at the reference numerals 410 and 412, and are the closest in frequency spacing to the so-called center frequency of the original data signal at 400. The second set of sidebands at 420 and 422 are spaced further apart, while the third set of sidebands 430 and 432 are spaced the farthest from the "center" frequency of the signal 400. When using the example of three modulation pattern sets with the count values described above, then the sidebands 430 and 432 will be produced while the CountA and RepeatA values are loaded into the state machine 30. The sidebands 420 and 422 will be generated when the CountB and RepeatB values are used in the state machine 30. The sidebands 410 and 412 will be generated when the CountC and RepeatC values are used in the state machine 30.

One important aspect of the present invention is the control over the generation of the sidebands or energy concentrations in a manner so that their nominal peak amplitudes will be substantially equal to one another. As noted above, this "equal" amplitude is highly dependent upon the actual data that arrives at the circuit 10. If the data is quite repeatable, then very good results should be obtained. For data that is not very repeatable, there will still be some benefit obtained by using the present invention, but it would likely be more prone to having sidebands that are not quite so equal in amplitude when comparing one set of sidebands to another. However, the logic used in state machine 30 could be adaptive, so that the register values are changed "on the fly" (i.e., in real time) in an attempt to compensate for different data patterns in the input signal 20. By use of adaptive logic, the present invention could attempt to equalize the amplitude of all the sidebands for such different (non-repeatable) data patterns.

FIG. 7 illustrates the sidebands at a so-called center frequency of 100 MHz, but it should be remembered that there will also be sidebands generated at the odd harmonics of this "center" frequency for any particular data signal that arrives at the input 20 of the electronics 10 of the present invention. These higher frequency harmonics are not depicted on FIG. 7, but this is a well-known principle in the field of electromagnetic energy reduction, by one of ordinary skill in this field of art.

It will be understood that the principles of the present invention can be utilized in situations where only a single data signal is involved, such as in a serial data stream that is to be transmitted over a data channel to a "receiving device." In this patent document, the terms "data channel," "transmit," and "receive" (and the like) are used in the broadest sense, in that the transmission and reception of the data signal is not necessarily over a "formal" communications link (e.g., one that might involve a radio transmitter and receiver). For example, in a laser printer, the "transmitting device" could be the output of an ASIC that contains a "RIP controller" (i.e., a device that controls raster image processing, e.g., to form a bitmap), the "receiving device" could be a laser diode, and the "communications channel" (or "data channel") could be a co-axial cable, or merely a wire or some type of shielded cable.

It will be further understood that the principles of the present invention can alternatively be utilized in situations where multiple parallel data signals are involved, such as in a parallel bus within a computing device, for example. When two parallel signals are involved, the modulation scheme (produced by two separate modulating devices, for example) can be identical for both signals, if desired. Unless the data transitions are exactly identical over time for both signals, the sidebands produced by the two different modulation-generating devices that are "preparing" the signals would be different, from one signal to the other, and this would tend to minimize and "additive" amplitudes of the electromagnetic emissions for any particular frequency band.

Alternatively, when two parallel signals are involved, the modulation scheme could be quite different for each of the signals, which would almost guarantee that the amplitude of the electromagnetic emissions for any particular frequency band would not be additive (from one signal and modulation-generating device to the next). In that circumstance, the data would almost never be such that the emissions would be significantly additive.

As a further alternative, when two parallel signals are involved, the modulation schemes could be identical for each of the signals, but out of phase with one another. It that circumstance, the electromagnetic emissions would not likely be additive for the two modulated signals unless the signals were themselves out of phase by essentially the same time interval that the modulation-generating devices are themselves executing out of phase. In general, this would be a very unlikely event, except perhaps intermittently. (One would literally have to make the data transitions and the modulation pattern designs intentionally stack up in such a manner, to achieve an "undesirable" result.)

It will also be understood that the logical operations described in relation to the flow charts of FIGS. 2-4 can be implemented using sequential logic, such as by using microprocessor technology, or using a logic state machine, or perhaps by discrete logic; it even could be implemented using parallel processors. One possible embodiment may use a microprocessor or microcontroller to execute software instructions that are stored in memory cells within an ASIC. In fact, the entire microprocessor or microcontroller along with dynamic RAM and executable ROM may be contained within a single ASIC, in a preferred mode of the present invention. A single ASIC could also contain a logic state machine along with its programmed instructions. Of course, other types of circuitry could be used to implement these logical operations depicted in the drawings without departing from the principles of the present invention.

It will be further understood that the precise logical operations depicted in the flow charts of FIGS. 2-4, and discussed above, could be somewhat modified to perform similar, although not exact, functions without departing from the principles of the present invention.

All documents cited in the Detailed Description of the Invention are, in relevant part, incorporated herein by reference; the citation of any document is not to be construed as an admission that it is prior art with respect to the present invention.

The foregoing description of a preferred embodiment of the invention has been presented for purposes of illustration and description. It is not intended to be exhaustive or to limit the invention to the precise form disclosed. Obvious modifications or variations are possible in light of the above teachings, without departing from the spirit and scope of the invention. The embodiment was chosen and described in order to illustrate the principles of the invention and its practical application to thereby enable one of ordinary skill in the art to utilize the invention in various embodiments and with various modifications as are suited to the particular use contemplated. It is intended to cover in the appended claims all such changes and modifications that are within the scope of this invention.

The invention claimed is:

1. A method for reducing electromagnetic emissions of data signals, said method comprising:
   (a) providing a controller having a first input, a modulating circuit, and a first output;
   (b) providing a demodulating circuit, having a second input, and a second output;
   (c) providing a data pathway between said first output and said second input;
   (d) receiving an input data signal at said first input;
   (e) repetitively modulating, at said modulating circuit, said input data signal according to a predetermined modulation cycle, in which said modulation cycle comprises at least one modulating pattern set, thereby generating a first output data signal that is directed to said first output, wherein said at least one modulation pattern set has an effect of removing electromagnetic energy from at least one center frequency of said input data signal, and generating concentrations of said electromagnetic energy that are located in a controlled manner as distinct patterns at other frequencies that are to sides of said at least one center frequency on a frequency spectrum graph;
   (f) transmitting said first output data signal from said first output to said data pathway;
   (g) receiving said first output data signal from said data pathway at said second input; and
   (h) demodulating, at said demodulating circuit, said first output data signal, and recombining said distinct patterns of said electromagnetic energy in a controlled manner such that said electromagnetic energy that was removed from said at least one center frequency of the input data signal is restored to its original form, thereby generating a second output data signal that is directed to said second output, wherein a data content of said second output data signal corresponds to a data content of said input data signal.

2. A method for reducing electromagnetic emissions of data signals, said method comprising:
   (a) providing a controller having a first input, a modulating circuit, and a first output;
   (b) providing a demodulating circuit, having a second input, and a second output;
   (c) providing a data pathway between said first output and said second input;
   (d) receiving an input data signal at said first input;
   (e) repetitively modulating, at said modulating circuit, said input data signal according to a predetermined modulation cycle, in which said modulation cycle comprises at least one modulating pattern set, thereby generating a first output data signal that is directed to said first output;
   (f) transmitting said first output data signal from said first output to said data pathway;
   (g) receiving said first output data signal from said data pathway at said second input; and
   (h) demodulating, at said demodulating circuit, said first output data signal, thereby generating a second output data signal that is directed to said second output, wherein a data content of said second output data signal corresponds to a data content of said input data signal;
   wherein one of said modulation pattern sets comprises:
   counting at least one transition of a predetermined type of said input data signal until reaching a predetermined first numeric value of said at least one transition, thereby comprising a first repeat cycle;
   after reaching said predetermined first numeric value of said at least one transition, repeating the step of counting said at least one transition of a predetermined type, as a second repeat cycle;
   counting each occurrence of reaching said predetermined first numeric value of said transitions for a plurality of repeat cycles, until a number of said plurality of repeat cycles reaches a predetermined second numeric value; and
   terminating said one of said modulation pattern sets.

3. The method as recited in claim 2, wherein said transition of a predetermined type of said input data signal comprises one of:
   (a) a rising edge transition, and
   (b) a falling edge transition.

4. The method as recited in claim 2, wherein said predetermined modulation cycle comprises a plurality of said modulation pattern sets, such that:
   for a first modulation pattern set, said first numeric value is CountA, and said second numeric value is RepeatA;
   for a second modulation pattern set, said first numeric value is CountB, and said second numeric value is RepeatB, wherein CountA is not equal to CountB, and RepeatA is not equal to RepeatB; and
   said first output data signal exhibits a plurality of concentrations of electromagnetic energy having an appearance on a frequency spectrum of a plurality of sidebands near a first frequency of said input data signal, wherein said plurality of sidebands are substantially equal in amplitude to one another on said frequency spectrum.

5. The method as recited in claim 4, wherein said first modulation pattern set produces a first set of said plurality of sidebands, and said second modulation pattern set produces a second set of said plurality of sidebands, such that said first and second sets of sidebands exhibit different frequencies for a given frequency exhibited by said input data signal.

6. A method for reducing electromagnetic emissions of data signals, said method comprising:
   (a) providing a controller having a first input, a modulating circuit, and a first output;
   (b) providing a demodulating circuit, having a second input, and a second output;
   (c) providing a data pathway between said first output and said second input;
   (d) receiving an input data signal at said first input;
   (e) repetitively modulating, at said modulating circuit, said input data signal according to a predetermined modulation cycle, in which said modulation cycle comprises at least one modulating pattern set, thereby generating a first output data signal that is directed to said first output;
   (f) transmitting said first output data signal from said first output to said data pathway;
   (g) receiving said first output data signal from said data pathway at said second input; and
   (h) demodulating, at said demodulating circuit, said first output data signal, thereby generating a second output data signal that is directed to said second output, wherein a data content of said second output data signal corresponds to a data content of said input data signal;
   wherein said controller comprises a quadrature signal generation circuit, a processing circuit, at least one register for holding numeric values that are provided for said processing circuit, a plurality of exclusive-OR gates, and a plurality of multiplexers.

7. The method as recited in claim 1, wherein said controller operates in at least one of a plurality of selectable modes, as follows:
   (a) a normal data signal mode without modulation;
   (b) a divide-by-2 mode without modulation;
   (c) a data signal mode with modulation; and
   (d) a divide-by-2 mode with modulation.

8. The method as recited in claim 1, wherein said demodulating circuit comprises one of: (a) an exclusive-OR gate, and (b) an exclusive-NOR gate.

9. The method as recited in claim 1, wherein said controller includes a processing circuit, and said processing circuit comprises one of:
   a logic state machine, a sequential processor device, a parallel processor device, and discrete logic elements.

10. A method for reducing electromagnetic emissions of data signals, said method comprising:
   (a) providing a controller having an input, a modulating circuit, and an output;
   (b) receiving an input data signal at said input;
   (c) repetitively modulating, at said modulating circuit, said input data signal according to a predetermined modulation cycle, in which said modulation cycle comprises at least two modulating pattern sets, thereby generating an output data signal that is directed to said output, wherein said at least two modulation pattern sets have an effect of removing electromagnetic energy from at least one center frequency of said input data signal, and generating concentrations of said electromagnetic energy that are located in a controlled manner as distinct patterns at other frequencies that are to sides of said at least one center frequency on a frequency spectrum graph.

11. A method for reducing electromagnetic emissions of data signals, said method comprising:
   (a) providing a controller having an input, a modulating circuit, and an output;
   (b) receiving an input data signal at said input;
   (c) repetitively modulating, at said modulating circuit, said input data signal according to a predetermined modulation cycle, in which said modulation cycle comprises at least two modulating pattern sets, thereby generating an output data signal that is directed to said output;
   wherein one of said modulation pattern sets comprises:
   counting at least one transition of a predetermined type of said input data signal until reaching a predetermined first numeric value of said at least one transition, thereby comprising a first repeat cycle;
   after reaching said predetermined first numeric value of said at least one transition, repeating the step of counting said at least one transition of a predetermined type, as a second repeat cycle;
   counting each occurrence of reaching said predetermined first numeric value of said transitions for a plurality of repeat cycles, until a number of said plurality of repeat cycles reaches a predetermined second numeric value; and
   terminating said one of said modulation pattern sets.

12. The method as recited in claim 11 wherein said transition of a predetermined type of said input data signal comprises one of:
   (a) a rising edge transition, and
   (b) a falling edge transition.

13. The method as recited in claim 11, wherein said predetermined modulation cycle comprises a plurality of said modulation pattern sets, such that:
   for a first modulation pattern set, said first numeric value is CountA, and said second numeric value is RepeatA;
   for a second modulation pattern set, said first numeric value is CountB, and said second numeric value is RepeatB, wherein CountA is not equal to CountB, and RepeatA is not equal to RepeatB; and
   said first output data signal exhibits a plurality of concentrations of electromagnetic energy having an appearance on a frequency spectrum of a plurality of sidebands near a first frequency of said input data signal, wherein said plurality of sidebands are substantially equal in amplitude to one another on said frequency spectrum.

14. The method as recited in claim 13, wherein said first modulation pattern set produces a first set of said plurality of sidebands, and said second modulation pattern set produces a second set of said plurality of sidebands, such that said first and second sets of sidebands exhibit different frequencies for a given frequency exhibited by said input data signal.

15. A method for reducing electromagnetic emissions of data signals, said method comprising:
   (a) providing a controller having an input, a modulating circuit, and an output;
   (b) receiving an input data signal at said input;
   (c) repetitively modulating, at said modulating circuit, said input data signal according to a predetermined modulation cycle, in which said modulation cycle comprises at least two modulating pattern sets, thereby generating an output data signal that is directed to said output;
   wherein said controller comprises a quadrature signal generation circuit, a processing circuit, at least one register for holding numeric values that are provided for said processing circuit, a plurality of exclusive-OR gates, and a plurality of multiplexers.

16. The method as recited in claim 10, wherein said controller operates in at least one of a plurality of selectable modes, as follows:
   (a) a normal data signal mode without modulation;
   (b) a divide-by-2 mode without modulation;

(c) a data signal mode with modulation; and
(d) a divide-by-2 mode with modulation.

17. An electronic controller for reducing electromagnetic emissions of data signals, said controller comprising:
   a first input that receives an input data signal;
   a modulating circuit, comprising:
      a processing circuit that counts a number of transitions of a predetermined type of said input data signal, and that counts a number of repeat cycles of said transitions, and generates a modulation control signal;
      a plurality of logic gates and multiplexers that receive said modulation control signal, and said data input signal, and manipulate said data input signal in a manner that has an effect of removing electromagnetic energy from at least one center frequency of said input data signal, and generates concentrations of said electromagnetic energy that are located in a controlled manner as distinct patterns at other frequencies that are to sides of said at least one center frequency on a frequency spectrum graph thereby creating a first output data signal; and
   a first output that transmits said first output data signal.

18. The electronic controller as recited in claim 17, wherein said transition of a predetermined type of said input data signal comprises one of:
   (a) a rising edge transition, and
   (b) a falling edge transition.

19. The electronic controller as recited in claim 17, further comprising a first counter element and a second counter element that each comprise at least one of:
   (a) a hardware counter circuit;
   (b) a register that is loaded and unloaded by way of a separate hardware circuit; and
   (c) a memory element that is controlled by said processing circuit.

20. An electronic controller for reducing electromagnetic emissions of data signals, said controller comprising:
   a first input that receives an input data signal;
   a modulating circuit, comprising:
      a processing circuit that counts a number of transitions of a predetermined type of said input data signal, and that counts a number of repeat cycles of said transitions, and generates a modulation control signal;
      a plurality of logic gates and multiplexers that receive said modulation control signal, and said data input signal, and manipulate said data input signal in a manner that generates concentrations of electromagnetic energy emissions near a frequency of said data input signal, thereby creating a first output data signal; and
   a first output that transmits said first output data signal;
   wherein said controller comprises a quadrature signal generation circuit, said processing circuit, at least one register for holding numeric values that are provided for said processing circuit, a plurality of exclusive-OR gates, and a plurality of multiplexers.

21. The electronic controller as recited in claim 20, wherein said processing circuit:
   operates as a first counter element for counting said transitions of a predetermined type of said input data signal until reaching a predetermined first numeric value of said transitions, and then repeating the step of counting said transitions;
   operates as a second counter element for counting a number of repeat cycles of said first counter element reaching said first numeric value, until said number of repeat cycles reaches a predetermined second numeric value; and
   thereby completing a modulation pattern set.

22. The electronic controller as recited in claim 20, wherein said processing circuit:
   operates as a first counter element for counting said transitions of a predetermined type of said input data signal until reaching a predetermined first numeric value of said transitions, and then repeating said step of counting said transitions;
   operates as a second counter element for counting a number of repeat cycles of said first counter element reaching said first numeric value, until said number of repeat cycles reaches a predetermined second numeric value;
   thereby completing a first of said at least one modulation pattern set;
   operates as said first counter element for counting said transitions of a predetermined type of said input data signal until reaching a predetermined third numeric value of said transitions, and then repeating said step of counting said transitions;
   operates as said second counter element for counting a number of repeat cycles of said first counter element reaching said third numeric value, until said number of repeat cycles reaches a predetermined fourth numeric value;
   thereby completing a second of said at least one modulation pattern set; and
   thereby completing one of said predetermined modulation cycles.

23. The electronic controller as recited in claim 17, wherein said processing circuit comprises one of:
   a logic state machine, a sequential processor device, a parallel processor device, and discrete logic elements.

24. The electronic controller as recited in claim 17, further comprising: a receiver circuit having a second input and a second output, and a data pathway between said first output and said second input;
   wherein (a) said data pathway receives said first output data signal from said first output and directs it to said second input, and (b) said receiver circuit demodulates said first output data signal, thereby generating a second output data signal that is directed to said second output, wherein a data content of said second output data signal corresponds to a data content of said input data signal.

25. The electronic controller as recited in claim 24, wherein said receiver circuit comprises one of: (a) an exclusive-OR gate, and (b) an exclusive-NOR gate.

26. The method as recited in claim 13, wherein said predetermined modulation cycle further comprises a third modulation pattern set, in which said first numeric value is CountC, and said second numeric value is RepeatC; wherein CountC is not equal to either CountA or CountB, and RepeatC is not equal to either RepeatA or RepeatB.

27. The method as recited in claim 26, wherein the numeric values for said predetermined modulation cycle are as follows:
   CountA =3; RepeatA =2;
   CountB =5; RepeatB =4; and
   CountC =7; RepeatC =6.

28. The method as recited in claim 1, wherein said at least one modulation pattern set has a further effect of removing electromagnetic energy from at least one center frequency of said input data signal, and generating concentrations of electromagnetic energy that are located in a controlled manner as distinct patterns at other frequencies that are near odd-numbered harmonics of said at least one center frequency on a frequency spectrum graph.

29. The method as recited in claim 10, wherein said at least two modulation pattern sets have a further effect of removing electromagnetic energy from at least one center frequency of said input data signal, and generating concentrations of electromagnetic energy that are located in a controlled manner as distinct patterns at other frequencies that are near odd-numbered harmonics of said at least one center frequency on a frequency spectrum graph.

30. The electronic controller as recited in claim 17, wherein said modulating circuit has a further effect of removing electromagnetic energy from at least one center frequency of said input data signal, and generating concentrations of electromagnetic energy that are located in a controlled manner as distinct patterns at other frequencies that are near odd-numbered harmonics of said at least one center frequency on a frequency spectrum graph.

* * * * *